United States Patent
Chimner (10) Patent No.: US 10,029,566 B2
(45) Date of Patent: Jul. 24, 2018

(54) METHOD FOR LIMITING CLUTCH TORQUE TO REDUCE HIGH MU WHEEL SLIP

(71) Applicant: Eaton Corporation, Cleveland, OH (US)

(72) Inventor: Christian Thomas Chimner, Royal Oak, MI (US)

(73) Assignee: Eaton Intelligent Power Limited, Dublin (IE)

( * ) Notice: Subject to any disclaimer, the term of this patent is extended or adjusted under 35 U.S.C. 154(b) by 49 days.

(21) Appl. No.: 15/027,939

(22) PCT Filed: Oct. 8, 2014

(86) PCT No.: PCT/US2014/059666
§ 371 (c)(1),
(2) Date: Apr. 7, 2016

(87) PCT Pub. No.: WO2015/054368
PCT Pub. Date: Apr. 16, 2015

(65) Prior Publication Data
US 2016/0229290 A1     Aug. 11, 2016

Related U.S. Application Data

(60) Provisional application No. 61/983,837, filed on Apr. 24, 2014, provisional application No. 61/888,694, filed on Oct. 9, 2013.

(51) Int. Cl.
*B60K 23/04* (2006.01)
*B60W 10/16* (2012.01)
(Continued)

(52) U.S. Cl.
CPC .......... *B60K 23/04* (2013.01); *B60K 23/0808* (2013.01); *B60K 2023/043* (2013.01);
(Continued)

(58) Field of Classification Search
CPC ............... B60W 10/16; B60W 10/184; B60W 2510/0275; B60W 2520/10;
(Continued)

(56) References Cited

U.S. PATENT DOCUMENTS 3,762,775 A  10/1973  Ochiai
4,790,404 A  12/1988  Naito
(Continued)

FOREIGN PATENT DOCUMENTS

EP  0315352 B1  1/1993
EP  0314453 B1  7/1993
(Continued)

OTHER PUBLICATIONS

International Search Report for PCT/US2014/059666 dated Feb. 4, 2015, pp. 1-3.
(Continued)

*Primary Examiner* — Ramya P Burgess
*Assistant Examiner* — David R Morris
(74) *Attorney, Agent, or Firm* — Mei & Mark, LLP (57) ABSTRACT

A method for limiting the amount of torque biased to a high mu wheel of a vehicle comprises processing clutch torque data to determine an electronic limited slip differential clutch torque limit, processing wheel speed data to generate mu slip data, comparing the generated mu slip data to threshold mu slip data. When the generated mu slip data is greater than the threshold mu slip data, the method comprises reducing the electronic limited slip differential clutch torque limit by a predetermined ratio.

17 Claims, 4 Drawing Sheets

(51) Int. Cl.
*B60K 23/08* (2006.01)
*B60W 30/18* (2012.01)

(52) U.S. Cl.
CPC .......... *B60W 30/18172* (2013.01); *B60W 2510/0275* (2013.01); *B60W 2520/10* (2013.01); *B60W 2520/28* (2013.01); *B60W 2550/148* (2013.01); *B60W 2710/027* (2013.01)

(58) Field of Classification Search
CPC ....... B60W 2520/28; B60W 2710/027; B60W 30/18172; B60W 2720/266; F16D 2500/10425; F16D 2500/30412; F16D 2500/30421; F16D 2500/30406; F16D 2500/3115; F16D 2500/3108; F16D 2500/5075; F16D 2500/70424; F16D 2500/70434; F16D 2500/7044
See application file for complete search history.

(56) References Cited

U.S. PATENT DOCUMENTS

| | | | |
|---|---|---|---|
| 4,884,650 A | 12/1989 | Fujiki et al. | |
| 5,004,064 A | 4/1991 | Tezuka et al. | |
| 5,070,961 A * | 12/1991 | Tezuka | B60K 23/0808 180/197 |
| 5,208,755 A | 5/1993 | Tezuka | |
| 5,456,641 A | 10/1995 | Sawase | |
| 5,538,337 A | 7/1996 | Harris et al. | |
| 6,443,539 B1 | 9/2002 | Atkins | |
| 6,460,647 B1 * | 10/2002 | Schmitt | B60K 28/16 180/197 |
| 6,564,139 B2 | 5/2003 | Sakakiyama | |
| 6,810,318 B2 | 10/2004 | Brooks et al. | |
| 6,890,041 B1 | 5/2005 | Ribbens et al. | |
| 8,043,184 B2 | 10/2011 | Boddy | |
| 8,352,145 B2 * | 1/2013 | Uematsu | B60K 17/35 180/197 |
| 8,364,355 B2 * | 1/2013 | Saito | B60W 30/18172 701/50 |
| 8,463,511 B2 * | 6/2013 | Uematsu | B60K 17/35 701/48 |
| 8,666,628 B2 * | 3/2014 | Noguchi | B60W 10/119 701/72 |
| 8,725,359 B2 * | 5/2014 | Uematsu | B60K 17/35 701/50 |
| 8,725,360 B2 * | 5/2014 | Uematsu | B60K 17/35 701/50 |
| 2002/0002433 A1 | 1/2002 | Matsuno | |
| 2002/0107628 A1 | 8/2002 | Sakakiyama | |
| 2005/0116536 A1 | 6/2005 | Schafiyha et al. | |
| 2006/0080021 A1 | 4/2006 | Park et al. | |
| 2009/0107747 A1 | 4/2009 | Luehrsen et al. | |
| 2010/0174454 A1 * | 7/2010 | Saito | B60W 30/18172 701/50 |
| 2010/0252348 A1 | 10/2010 | Ueda et al. | |
| 2011/0246031 A1 * | 10/2011 | Uematsu | B60K 17/35 701/50 |
| 2011/0251762 A1 * | 10/2011 | Uematsu | B60K 17/35 701/50 |
| 2011/0257861 A1 * | 10/2011 | Uematsu | B60K 17/35 701/88 |
| 2012/0041651 A1 * | 2/2012 | Uematsu | B60K 17/35 701/50 |
| 2012/0265402 A1 | 10/2012 | Post, II et al. | |
| 2016/0356370 A1 * | 12/2016 | Richards | B60W 10/16 |
| 2017/0066447 A1 * | 3/2017 | Hertel | B60W 30/18172 |

FOREIGN PATENT DOCUMENTS

| | | |
|---|---|---|
| EP | 0415554 B1 | 1/1994 |
| EP | 0575152 B1 | 8/1996 |
| EP | 1232900 B1 | 12/2009 |
| JP | H8011565 A * | 1/1996 |

OTHER PUBLICATIONS

Written Opinion of the International Searching Authority for PCT/US2014/059666 dated Feb. 4, 2015, pp. 1-4.
European Search Report for 10006P0408PCTEP, PCT/US14/059666 dated Apr. 13, 2017 pp. 1-7.

* cited by examiner

METHOD FOR LIMITING CLUTCH TORQUE TO REDUCE HIGH MU WHEEL SLIP

This is a § 371 Application of PCT/US2014/059666, filed Oct. 8, 2014 and claims the benefit of U.S. provisional application No. 61/888,694, filed Oct. 9, 2013, and claims the benefit of U.S. provisional application No. 61/983,837, filed Apr. 24, 2014 all of which are incorporated herein by reference.

TECHNICAL FIELD

The present invention relates to a method for limiting driveline differential clutch torque to reduce high mu (μ) wheel slip.

BACKGROUND

As a vehicle accelerates on an uneven μ (friction coefficient) surface, a drive slip control system can intervene in the operation of the vehicle in such a way that the low μ wheel (the wheel located on the slick side of the road surface) is braked by braking intervention. In the braking intervention, the braking torque exerted by the brake of the low μ wheel is transferred via the differential to the high μ wheel (the other wheel that is located on the road surface with high μ and is not yet slipping). This transferred drive torque can in turn cause the high μ wheel to begin slipping; as a result, the stability and in particular lateral stability of the vehicle, as well as traction at the wheel which is still adhering, are lost.

SUMMARY

It is an object of the present invention to provide a method for limiting clutch torque to reduce high μ wheel slip once high μ wheel slip is detected. A method for limiting the amount of torque biased to a high μ wheel of a vehicle comprises processing clutch torque data to determine an electronic limited slip differential clutch torque limit, processing wheel speed data to generate mu slip data, comparing the generated mu slip data to threshold mu slip data. When the generated mu slip data is greater than the threshold mu slip data, the method comprises reducing the electronic limited slip differential clutch torque limit by a predetermined ratio.

BRIEF DESCRIPTION OF THE DRAWINGS

The accompanying drawings, which are incorporated in and constitute a part of this specification, illustrate several examples of the disclosure.

DETAILED DESCRIPTION

Reference will now be made to the examples of the disclosure, which are illustrated in the accompanying drawings. Directional references such as "left" and "right" are for ease of reference to the figures and are not meant to be limiting. While the disclosure references, in large part, a Front-Wheel Drive (FWD) vehicle and operational mode, the concepts are equally applicable to a Rear-Wheel Drive (RWD) vehicle or All-Wheel Drive (AWD or 4WD). Because of this, references to "front" and "rear" are, at times, for convenience and consistency of discussion and are not meant to exclude the applicability of the disclosure to RWD or AWD vehicles. Therefore, a primary drive axle may be the axle of a FWD, RWD, or AWD operating vehicle. An auxiliary drive axle may be the pushed or pulled axle of a vehicle operating in FWD or RWD mode. The auxiliary axle becomes a powered axle when AWD is activated and engine power is actively supplied to the auxiliary axle.

Figure 1:
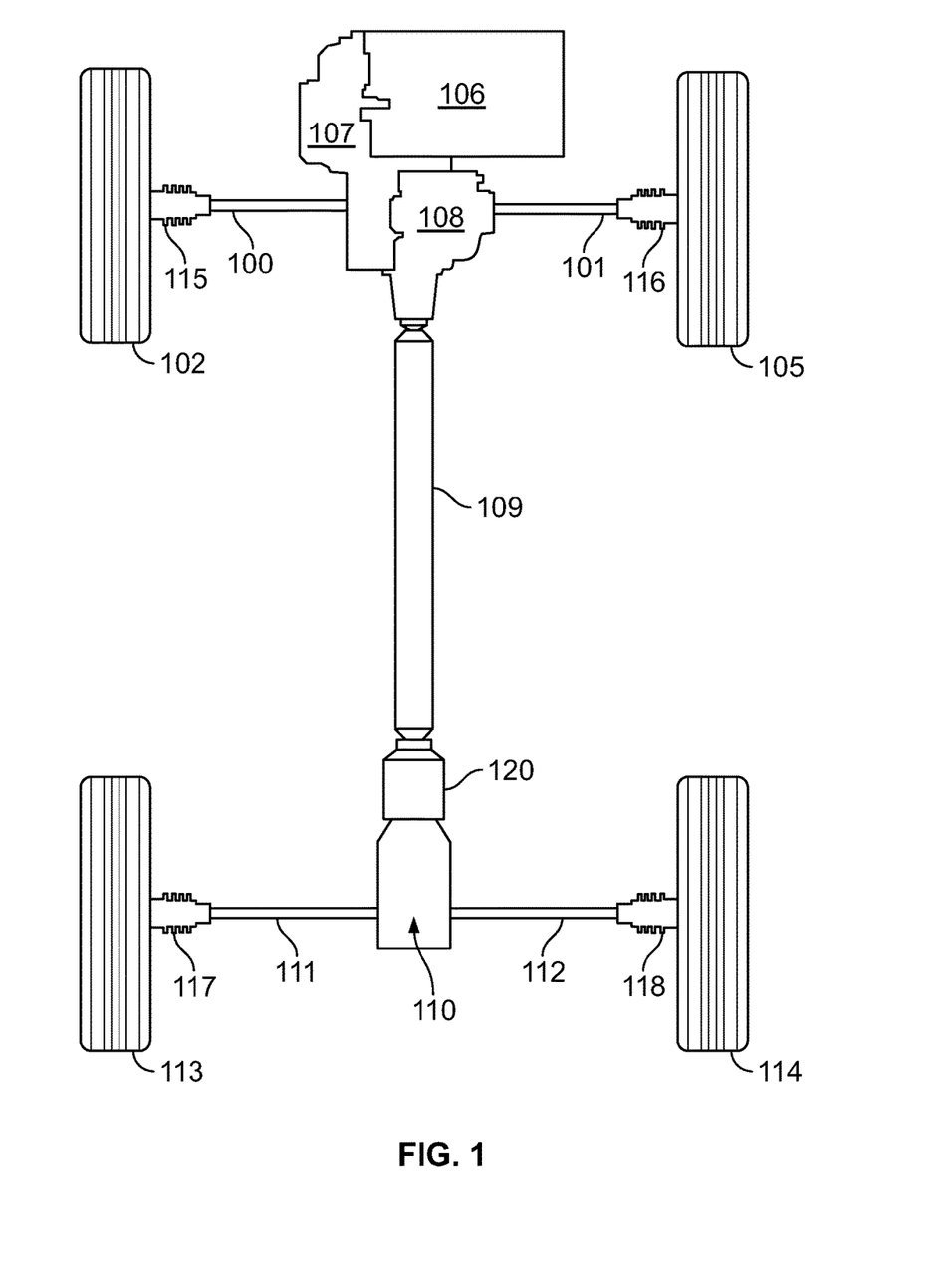
FIG. 1 is a schematic example of a simplified vehicle driveline.

FIG. 1 is a simplified schematic example of a vehicle driveline. An primary drive axle may be a single shaft spanning between wheels, or, as shown, may include left and right half shafts 100, 101 and left and right wheels 102, 105. Optional elements include left and right wheel hub disconnects 115, 116 and a differential system, which may be centralized or comprise left and right front differentials. An engine 106 generates motive power which is transferred to a transmission 107 for use in the vehicle as torque. Each component may further include a sensor and electronic and or hydraulic actuator.

The power transfer unit 108 may be a pass-through for the torque, allowing the torque to remain in the primary drive axle left and right half shafts 100, 101 during an unengaged condition, but transferring the torque during an engaged condition. An engagement feature, such as a synchronizer or clutch pack, in power transfer unit 108 enables a selectable amount of torque to transfer from primary drive axle to drive shaft 109. Drive shaft 109 can be coupled to, for example, a pinion, which couples to the engagement feature via a hypoid gear. Drive shaft 109 selectively couples torque to an optional ECC (electronically controlled coupler), or, as illustrated, to an all-wheel drive coupling 120. The torque may then pass to rear drive unit 110, which can house a rear differential attached to left and right auxiliary half shafts 111, 112. Torque can be selectively coupled to left and right rear wheels 113, 114 with optional rear wheel hub disconnects 117, 118.

Torque is controllable in the driveline for such purposes as slip, anti-slip, cornering, braking and other driving purposes. The disclosure will focus on slip and anti-slip torque control.

The differentials function to selectively couple an amount of torque to left and right front and rear wheels 102, 105, 112, and 113. The differentials comprise coupling members that selectively output all or some of the torque input to the differential. The differentials may comprise, for example, wet clutch plates or other synchronizer for the selective torque transfer. The differentials comprise torque vectoring mechanisms that allow for electronic control and limited slip functionality.

When the methods are implemented in a FWD vehicle, in lieu of a rear differential, the rear drive unit 110 houses non-differentiating coupling members to transfer torque to the half-shafts. When the methods are implemented in a RWD vehicle, the principles of the method are applied to the rear differential, but the vehicle may or may not include a front differential. That is, in some implementations, the vehicle could have a single eLSD (electronic limited slip differential) in the front or rear axle. When the methods are implemented in an AWD vehicle, both front and rear differential mechanisms are included. The differentials can be transversely or laterally mounted with the transmission on the primary drive axle, and the auxiliary axle differential can be centrally mounted on the auxiliary axle.

The vehicle of FIG. 1 can operate, in a default state, in FWD mode. All engine power can remain in the primary drive axle so that active torque transfer occurs to left and right front wheels 102, 105. Front differential and primary left and right wheel hubs 115 and 116 can electronically couple to sensors and a control area network (CAN) of an electronic control system 320 and they can receive commands to open and close their couplings to control vehicle dynamics such as slip, lateral acceleration, longitudinal acceleration, trajectory, yaw, etc. Such coupling control can assist with maintaining safe vehicle operation. Additional connectivity between sensors 301, CAN 319, rear drive unit 110 and rear wheel hubs 117, 118 provide auxiliary axle torque control.

A high μ wheel is one of a vehicle's wheels that is located on a surface with relatively high friction coefficient μ when the vehicle runs on a ground surface with uneven μ. Existing electronic limited slip differential (eLSD) traction controllers can bias too much torque to the high μ wheel during vehicle acceleration, which may result in vehicle instability and undesired vehicle oversteer or understeer. The undesired vehicle oversteer or understeer is caused by a reduction in lateral tire force once the high mu wheel is spinning Thus, it is beneficial to limit clutch torque when high mu slip is detected to reduce high mu wheel slip speed and to improve vehicle stability. This is a departure from other systems, which rely on braking, alone, to control wheel spin. In this disclosure, an eLSD may be used to apply or restrict torque to the wheels, and brakes are not mandatory to apply torque to the high mu wheel. Torque is instead transferred directly to the high nu wheel via the clutch of the eLSD.

Figure 2A:
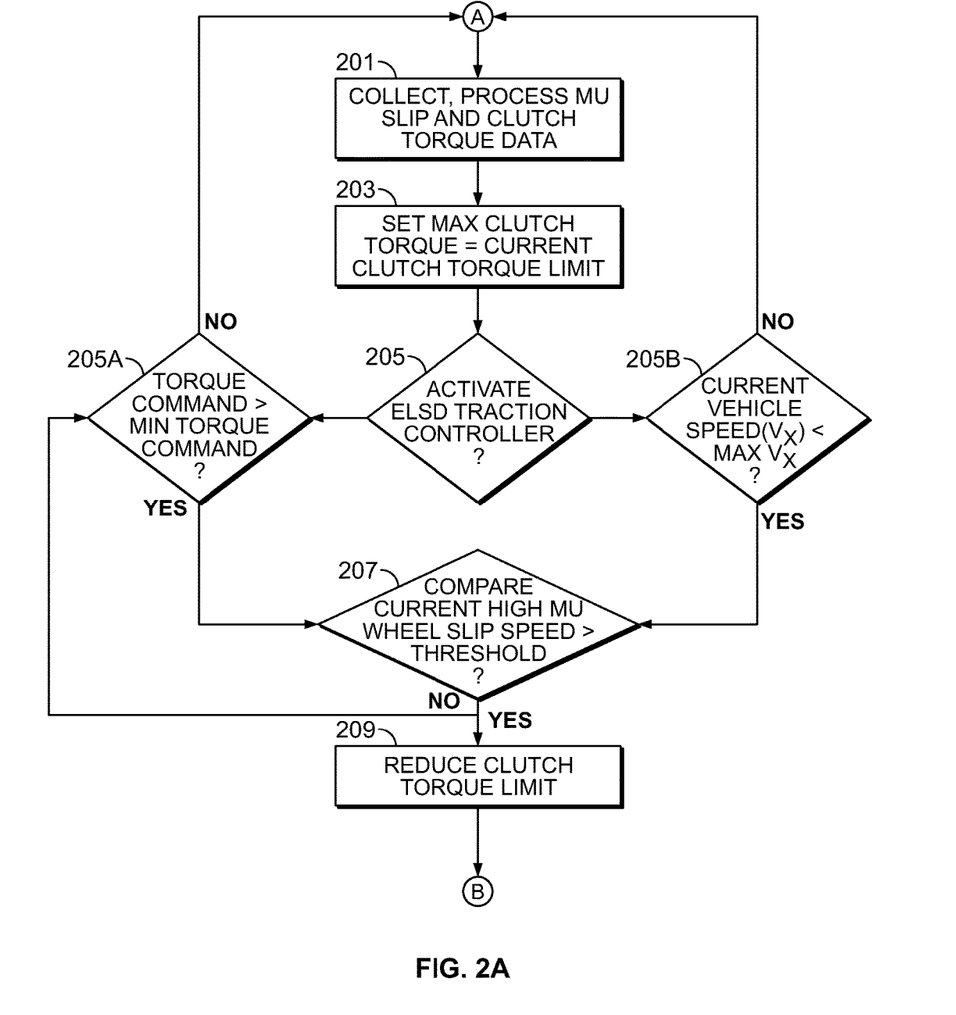
FIGS. 2A-2B illustrate steps for limiting clutch torque.

FIG. 2A illustrates an example of a first phase A of a method of limiting the amount of torque that is biased to a high μ wheel by an eLSD once high μ wheel slip is detected. Since a high μ wheel slip is defined as the difference between the minimum wheel speed of the driven axle and the average speed of the undriven axle, the first phase A determines whether a high μ slip is present.

Sensors 301 collect needed data for μ slip and clutch torque calculations, and the data is processed in ECU 320 in step 201. Processing can include feedback processing, including proportion-integral-derivative (PID) control algorithms.

In step 203, the current clutch torque limit is set to be the maximum clutch torque that the eLSD traction controller can command. The clutch torque limit will remain at the maximum clutch torque until the eLSD traction controller 315 is activated. The clutch torque limit is reduced when high μ wheel slip is detected. In phase B, the clutch torque limit is continuously adjusted.

Step 205 determines if the eLSD traction controller 315 should be activated. This is done in two parts. Step 205A compares the current torque command from the traction controller against a minimum torque command calibration value (typically in the range of 10 Nm). In step 205B, the current vehicle speed Vx is compared against the maximum vehicle speed threshold MaxVx for torque limiting. If the current torque command is greater than the minimum torque command, and the current vehicle speed Vx is less than the maximum vehicle speed threshold MaxVx, the method will go on to the next step. Otherwise, the method goes back to the start.

In step 207, it is detected whether a slip of the high μ wheel occurs. This is carried out by comparing the current high μ wheel slip speed HiMuSlp against a predetermined high μ slip detection threshold. The high μ wheel slip HiMuSlp is defined as the difference between the minimum wheel speed of the driven axle and the average speed of the undriven axle. The high μ wheel slip for a FWD and that for a RWD vehicle are respectively calculated with equations 1 and 2 below:

$$HiMuSlp = Min(wFL, wFR) - Average(wRL, wRR) \quad (1)$$

$$HiMuSlp = Min(wRL, wRR) - Average(wFL, wFR) \quad (2)$$

where wFL, wFR, wRL, and wRR respectively stand for the front left, front right, rear left, and rear right wheel speeds. The average wheel speed of the rear and front wheels, Average (wRL, wRR) and Average (wFL, wFR), should approximate the vehicle speed and should approximate the speed of the hi mu wheel when the wheel is not slipping. Thus, alternative calculations can compare vehicle speed or high mu wheel speed to determine whether a high mu wheel slip is occurring.

If the detected value of the high μ wheel slip is greater than the high μ slip detection threshold, it is determined that the high μ wheel is slipping and the method goes on to step 209 to reduce the clutch torque limit. Otherwise, the method returns to step 205A to determine if the torque command is greater than a minimum torque command. If the torque command is indeed greater than the minimum torque command, the method will go back and re-execute step 207; if not, the method executes phase A anew.

In step 209, the clutch torque limit is reduced to the current estimated clutch torque multiplied by a calibratable ratio (Torque Ratio, range 0-1). The clutch torque is estimated, for example, by way of a feedback-based model. The calibratable ratio can be fixed or selected from a look up table (LUT). This quickly reduces the clutch torque by a fixed percentage, which in turn quickly reduces the amount of torque that is sent to the high μ wheel once the high μ wheel slip is detected, which improves the stability of a vehicle.

Figure 2B:
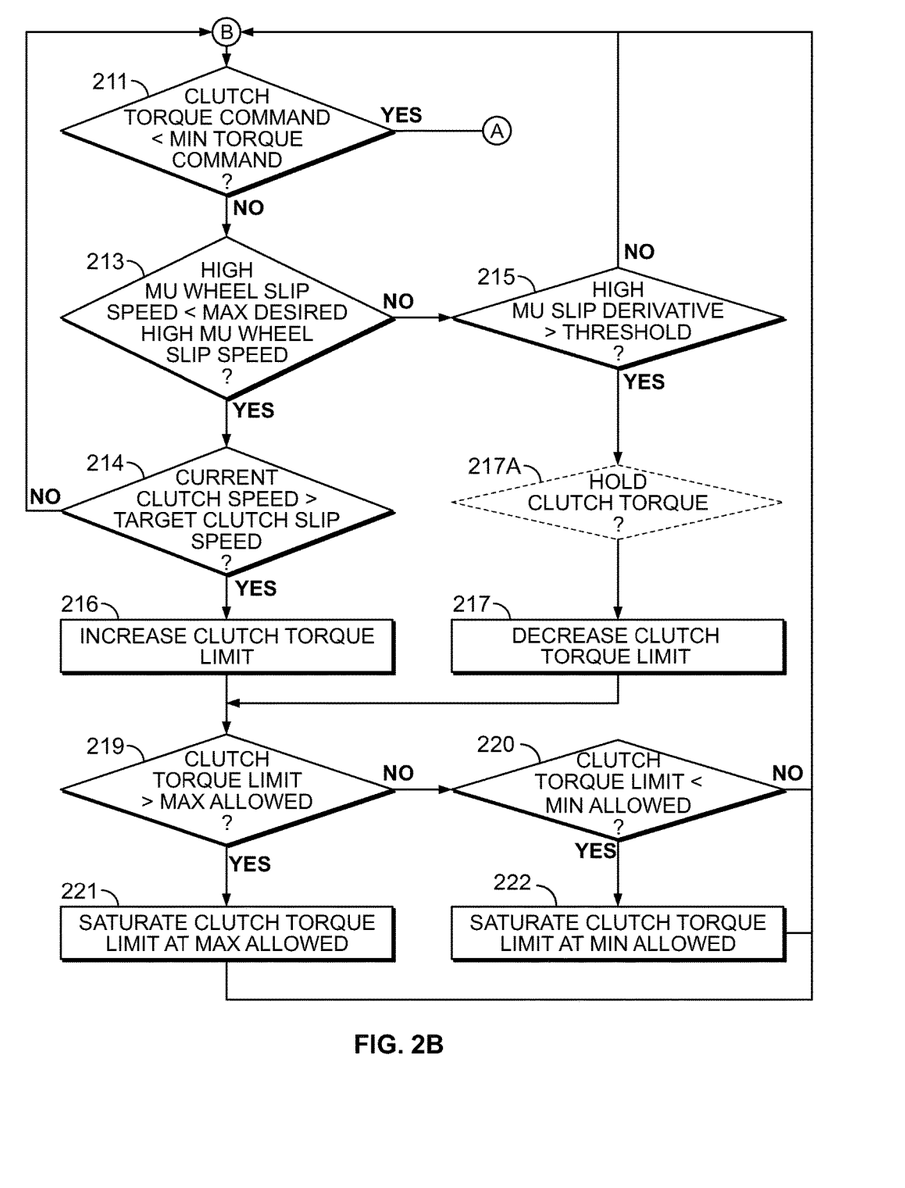

The method then enters phase B, shown in FIG. 2B. Upon entering phase B, the clutch torque limit is continuously adjusted until clutch control is no longer needed. Phase B is repeated every time the traction controller output is updated until the current torque command is less than the minimum clutch torque required to activate the high μ slip detection (upon which phase A is reinitialized). Thus, the minimum clutch torque is a system activation indicator. Phase B includes a first torque change calibration value selected from a first LUT for use when decreasing the clutch torque limit, and a second torque change calibration value selected from a second LUT for use when increasing the clutch torque limit. In addition to using lookup tables, the method may rely on other storage and retrieval strategies for predetermined data, and can also alternatively comprise sub-routines for performing real-time calculations for the first and second torque change calibration values.

In step 211, it is determined whether the clutch torque command is less than a minimum torque command. If so, the method will go back and re-exectute phase A; but if not, the method goes to step 213.

In step 213, the method compares the current high mu wheel slip speed against a maximum desired high μ wheel slip speed. The method goes on to step 215 if current high mu wheel slip speed is smaller than the maximum desired high mu wheel slip speed, but if the comparison is greater, the method goes to step 214.

During step 215, the method checks if the high mu slip derivative is greater than a calibratable threshold minimum high mu slip derivative. If no, the method goes back to execute phase B anew. If yes, the value of the clutch torque limit is decreased by a torque change calibration value selected from the first LUT.

The value of the calibratable threshold minimum high mu slip derivative is typically set as 0 so that the clutch torque limit is only decreased when the high mu wheel slip speed is increasing, such as when the derivative is positive.

Since there is a delay in high μ wheel deceleration when the clutch torque is decreasing (caused by wheel inertia), it is advantageous to hold the clutch torque limit at the current value while the high mu slip wheel is reducing towards the target limit. This can be done in optional step 217A, which can be before or after step 217. This helps to reduce over-limiting of the clutch torque to a level lower than required to stop the high μ wheel slip. For example, it is possible to hold the clutch torque limit after comparing the high mu slip speed to a target speed. If the high mu wheel slip speed is decreasing, then the clutch torque is held at its current value. If the high mu wheel slip speed increases again, the system can terminate the hold to again decrease the high mu wheel slip speed below the target speed. Then, once below the target speed, the system can switch over to increasing logic.

To help improve the performance of the method, it is also advantageous to adjust the rate at which the clutch torque limit is decreased by making the value of a first torque change calibration value of the first LUT a function of the current high μ wheel slip speed. In this way, the clutch torque limit can be decreased quickly when the high mu wheel slip speed is high to quickly reduce the clutch torque limit, while making more gradual changes when the high mu wheel slip speed is low, which helps improve the stability of the algorithm.

If step 213 shows that the high mu wheel slip speed is less than the maximum desired high μ wheel slip speed, the method can go to step 214 to determine if the current clutch slip speed is greater than a target clutch slip speed. The target clutch slip speed is determined by the eLSD traction controller 315. If step 214 is negative, the process returns to the start of phase B, but if the result of step 214 is positive, the process proceeds to step 216.

In step 216, the clutch torque limit is increased by a calibration value from second LUT. Torque distribution controller 316 can integrate the change and command clutch torque changes.

In this way the clutch torque limit is only increased when the high mu wheel slip speed is below the maximum allowable slip speed, and when the traction controller needs more torque to reduce the delta speed between the left and right wheel of the drive axle, which is a primary function of an eLSD.

To help improve the performance of the algorithm, it is advantageous to adjust the rate at which the clutch torque limit is increased by making the values of a second torque change calibration value of the second LUT a function of the current clutch slip. In this way, the clutch torque limit can be increased quickly when there is a lot of clutch slip, which improves vehicle tractive capability and also helps to reduce clutch wear. This also makes more gradual changes when the clutch slip speed is low, which improves the stability of the high μ slip control.

Thus, the ECU can receive and processing vehicle data and can adjust the clutch torque limit based on the vehicle data. The ECU can calculate a current clutch slip, and adjust the clutch torque limit at an adjustable rate. The adjustable rate can be a function of the current clutch slip. The adjustable rate can be exponential, such that the clutch torque limit is adjusted at a greater rate when the clutch slip is high, but the clutch torque limit is adjusted at a lower rate when the clutch slip is low To finish phase B, the method checks that the current clutch torque limit is between the maximum allowed clutch torque and the minimum allowed clutch torque. In Step 219, if the clutch torque limit is above the maximum allowed clutch torque, the clutch torque is saturated at the maximum allowed clutch torque at step 221. But, if not, at step 220, the system determines if the clutch torque limit is less than the minimum allowed clutch torque. If so, at step 222, the clutch torque limit is saturated at the minimum allowed clutch torque. The saturation eliminates clutch windup.

The system returns to re-execute phase B anew until the current torque command is less than the minimum torque clutch required to activate the high μ slip detection upon which phase A is reinitialized.

Figure 3:
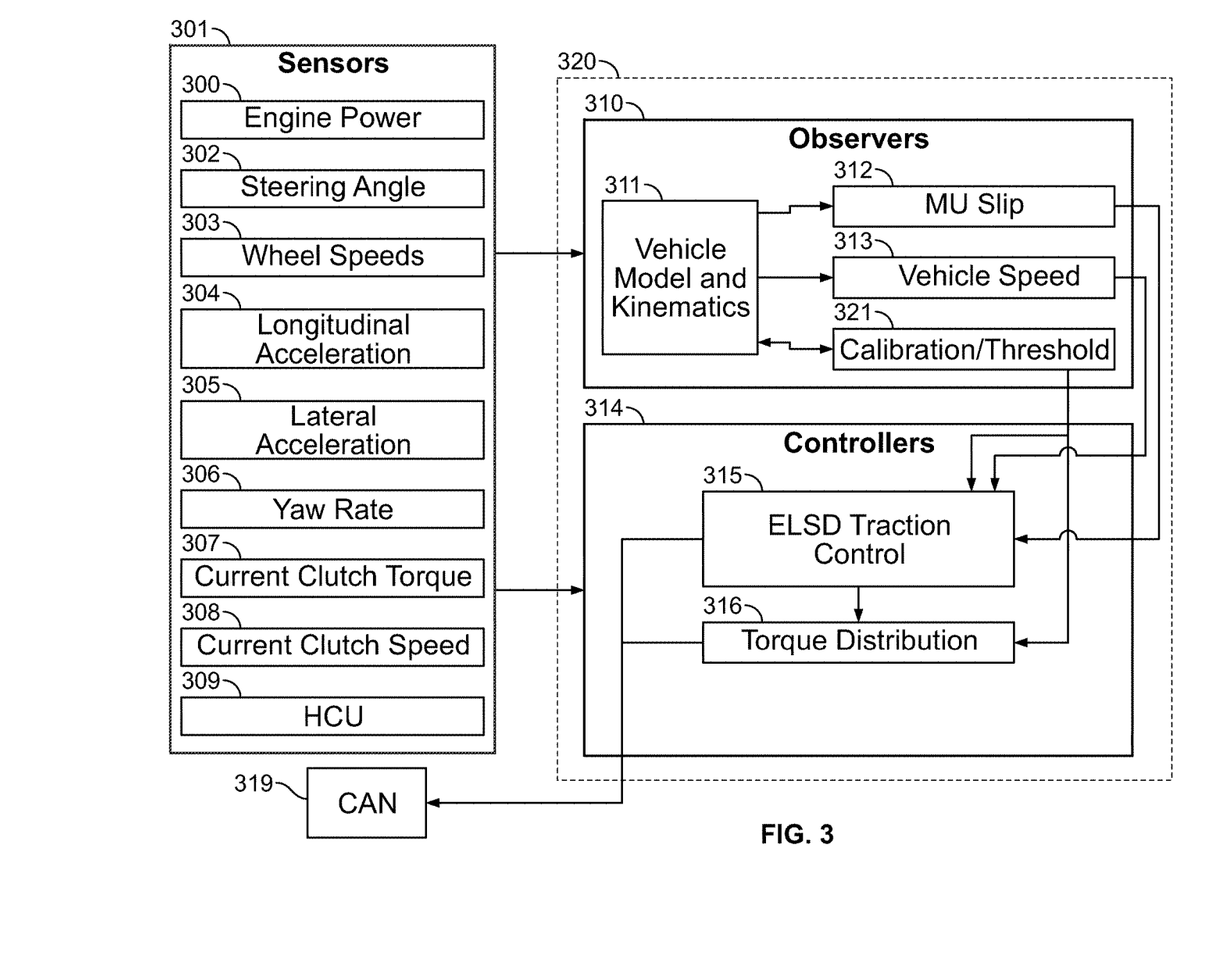
FIG. 3 illustrates one example of an electronic control unit (ECU).

In order to complete the disclosed processes, the driveline comprises a variety of electronic and hydraulic components that communicate with an electronic control unit (ECU) 320. Appropriate connective members such as wires, cables, hoses, etc. are supplied along the driveline between the ECU 320 and at least one hydraulic control system and/or electronic control system having motors or solenoids. If necessary, the ECU 320 comprises several remote computer devices in the vehicle, or the ECU 320 alternatively comprises remote computing devices that relay communications to each other or a central ECU 320.

FIG. 3 shows an exemplary schematic for a vehicle control system. The vehicle control system comprises more or less exemplary sensors 301, at least ECU 320, and at least one vehicle bus with associated controller area network (CAN) 319. The vehicle bus/CAN 319 can connect to at least one hydraulic controller for hydraulically controlled clutches or hydraulic PTU engagement features. Vehicle bus/CAN 319 can alternatively or contemporaneously connect to actuators for electrical control of devices. In lieu of having separate electrical lines for each sensor and actuator at each driveline component, the CAN can be bidirectional. That is, the CAN can send commands from the ECU 320 and return data from the sensors 301.

Sensors 301 are dispersed around the vehicle to collect data for use in observers 310 and controller 314 of ECU 320. The sensors comprise one or more of an engine power sensor 300, steering angle sensor 302, wheel speed sensor 303, longitudinal acceleration sensor 304, lateral acceleration sensor 305, yaw rate sensor 306, current clutch torque sensor 307, current clutch slip speed sensor 308, and hydraulic control unit sensor 309. The sensors shown in FIG. 3 are exemplary only, and additional or fewer sensors can be used. For example, sensors can be included for any motor or solenoid actuators and rotational sensors can be used to sense the rotational speed of the pinion, auxiliary drive axles 111, 112, primary drive axles 100, 101, drive shaft 109, differentials, wheel hubs, etc. Sensors can also be implemented to confirm the open or closed status of the PTU engagement feature, AWD coupling 120, RDU 110, etc. The sensor data is supplied to the ECU 320 for observational purposes and for control purposes.

The sensors 301 forward data to the ECU 320, which comprises at least one processor with an associated memory device and stored algorithms. The processor can be part of a computer system or on-board chip system. The memory device can be a FLASH, ROM, RAM or other tangible storage device for storing processor-readable instructions which, when executed by a processing device, cause the processing device to perform the disclosed methods. That is, ECU 320 can receive vehicle operational data from sensors 301 and can process the data to determine vehicle dynamics, engine power needs, thresholds, step timing, completion of commands, etc. ECU 320 can also issue commands to implement each step of the engagement and disengagement processes. And, ECU 320 can compare processed and received data, pull stored predetermined data from the memory device, push received data to the memory device for storage, update stored memory data and instructions, and make determinations of vehicle conditions.

The processor of the ECU 320 can comprise one or more observers 310, which can comprise a vehicle model and kinematics observer 311. The vehicle model and kinematics observer 311 processes the data from sensors 301 according to programmed algorithms and creates data, which can be forwarded to mu slip 312, vehicle speed 313, and calibration/threshold processing capabilities. Additional data can also be created by vehicle model and kinematics observer 311, such as bank angle or roll angle data. Calibratable values, such as first LUT and second LUT, and predetermined or calculated thresholds can be stored and calculated in Calibration/Threshold 321.

Mu slip observer 312 can collect and process data to determine the presence or absence of a high mu wheel slip. Vehicle speed observer 313 can collect and process data for determining whether the vehicle is within an operating range for mu slip control logic implementation.

As indicated in FIG. 3, the sensors 301 supply data to the controllers to enable implementation feedback. The sensors sense changes in vehicle conditions, which can be processed, observed, and used in the determination of new commands from the controllers 314.

The mu slip 312, vehicle speed 313, and calibration/threshold 321 data is shared with controller 314, which also collects data from sensors 301. Controller 314 can be a part of the processor of the ECU 320 having observers 310. Or, controller 314 can be an additional processor with associated memory and stored algorithms which cooperate with the processor having observers 310. A traction control algorithm controller 315 is used to make determinations based upon at least one of the mu slip 312, vehicle speed 313, and calibration/threshold 321 output data, sensors 301 data, additional sensors, and additional data. The torque distribution controller 316 can process and transmit the above torque commands for the driveline. Based on the results of the determinations made by the eLSD traction control algorithm controller 315 and the torque distribution controller 316, commands are sent from the controller via the vehicle bus to CAN 319 for implementation by various vehicle actuators at various locations along the vehicle driveline. The location and function of the vehicle actuators are not shown, but are within the knowledge of one of ordinary skill in the art. The commands from the controller relate to various electronically controlled stability features associated with the vehicle, including but not limited to traction control, anti-lock braking, oversteering control, understeering control, limited slip differential control, and rollover control.

Results from eLSD traction controller 315 are also forwarded to torque distribution controller 316. Torque distribution controller 316 determines how much torque to transfer from the primary drive system to the auxiliary drive system. Commands from torque distribution controller 316 are also forwarded for control of the hydraulics control unit. The torque distribution controller 316 implements the torque command methods and tracks torque commands for comparisons.

The combination of sensors 301, ECU 320, hydraulic and/or electronic control, and actuators allows cooperation, control and observation of moving parts along the driveline. The vehicle control system assists with the synchronous operation of the AWD and RWD systems. The ECU system may determine the extent and timing of mechanical engagement of the various disclosed coupling members of the driveline. The ECU system also assists with the extent and timing of disengagement of the various disclosed coupling members of the driveline for idling of the auxiliary drive system.

In addition to that shown in FIG. 3, the observers 310 and controllers 314 can rely for implementation on programming stored in the ECU 320. The observers 310 can comprise a dedicated processor and the controllers 314 can comprise a dedicated processor, or a single processor can operate programming for both observers and controllers.

It is intended that the specification and examples illustrated in the drawings be considered as exemplary only. Various other modifications and changes may be made thereto, and additional embodiments may be implemented, without departing from the broader scope of the invention as set forth in the claims. The specification and drawings are accordingly to be regarded in an illustrative rather than restrictive sense, with the true scope and spirit of the invention being indicated by the following claims.

I claim:

1. A method for limiting an amount of torque biased to a wheel of a vehicle with a high mu slip, comprising:
processing clutch torque data to determine an electronic limited slip differential clutch torque limit;
processing wheel speed data to generate mu slip data for the wheel;
comparing a current torque command from a traction controller to the wheel against a torque command calibration value;
processing at least the wheel speed data to determine if a vehicle speed (Vx) of the vehicle is less than maximum vehicle speed threshold (MaxVx);
comparing the generated mu slip data of the wheel to threshold mu slip data; and
when the generated mu slip data is greater than the threshold mu slip data for the wheel, thus indicating that the high mu wheel is slipping, reducing the electronic limited slip differential clutch torque limit by a predetermined ratio to reduce the torque biased to the wheel of the vehicle.

2. The method of claim 1, wherein the step of processing wheel speed data comprises generating a mu wheel slip speed (HiMuSlip) using one of equations 1 or 2:

$$\text{HiMuSlp} = \text{Minimum}(wFL, wFR) - \text{Average}(wRL, wRR) \quad \text{eq.1}$$

$$\text{HiMuSlp} = \text{Minimum}(wRL, wRR) - \text{Average}(wFL, wFR), \quad \text{eq. 2}$$

where wFL, wFR, wRL, and wRR respectively stand for the front left, front right, rear left, and rear right wheel speeds.

3. The method of claim 1, further comprising adjusting the clutch torque limit until the current torque command is less than the torque command calibration value.

4. The method of claim 3, wherein the step of adjusting the clutch torque limit comprises at least one of decreasing the clutch torque limit by a first torque change calibration value, and increasing the clutch torque limit by a second torque change calibration value.

5. The method of claim 4, further comprising determining whether mu wheel slip speed is less than a maximum mu wheel slip speed.

6. The method of claim 5, further comprising determining whether a current clutch slip speed is greater than a target clutch slip speed.

7. The method of claim 5, further comprising comparing a mu wheel slip speed derivative to a threshold minimum mu wheel slip speed derivative.

8. The method of claim 7, further comprising processing wheel speed data to determine whether wheel slip is increasing or decreasing, and, when the wheel slip is decreasing, holding a clutch torque limit.

9. The method of claim 4, wherein the first torque change calibration value is a function of the generated mu wheel slip speed.

10. The method of claim 4, wherein the second torque change calibration value is a function of a current clutch slip speed.

11. The method of claim 3, further comprising comparing the clutch torque limit to a maximum allowed clutch torque limit and a minimum allowed clutch torque limit, determining whether the clutch torque limit is closer to the maximum allowed clutch torque limit or to the minimum allowed clutch torque limit, and, based on the determination, setting the clutch torque limit at the closest of the maximum allowed clutch torque limit and the minimum allowed clutch torque limit.

12. The method of claim 1, further comprising receiving and processing vehicle data; and adjusting the clutch torque limit based on the vehicle data.

13. The method of claim 12, wherein adjusting the clutch torque limit is done at an adjustable rate, and wherein the adjustable rate is a function of a current clutch slip.

14. The method of claim 13, wherein the clutch torque limit is adjusted at a greater rate when the clutch slip is high, but the clutch torque limit is adjusted at a lower rate when the clutch slip is low.

15. A method for limiting an amount of torque biased to a wheel of a vehicle with a high mu slip, comprising:
processing clutch torque data to determine an electronic limited slip differential clutch torque limit;
processing wheel speed data to generate mu slip data for the wheel;
comparing the generated mu slip data of the wheel to threshold mu slip data;
when the generated mu slip data is greater than the threshold mu slip data for the wheel, thus indicating that the high mu wheel is slipping, reducing the electronic limited slip differential clutch torque limit by a predetermined ratio to reduce the torque biased to the wheel of the vehicle; and
comparing a mu wheel slip speed derivative to a threshold minimum mu wheel slip speed derivative.

16. The method of claim 15, further comprising processing wheel speed data to determine whether wheel slip is increasing or decreasing, and, when the wheel slip is decreasing, holding a clutch torque limit.

17. A method for limiting an amount of torque biased to a wheel of a vehicle with a high mu slip, comprising:
processing clutch torque data to determine an electronic limited slip differential clutch torque limit;
processing wheel speed data to generate mu slip data for the wheel;
comparing the generated mu slip data of the wheel to threshold mu slip data;
when the generated mu slip data is greater than the threshold mu slip data for the wheel, thus indicating that the high mu wheel is slipping, reducing the electronic limited slip differential clutch torque limit by a predetermined ratio to reduce the torque biased to the wheel of the vehicle;
comparing the clutch torque limit to a maximum allowed clutch torque limit and a minimum allowed clutch torque limit;
determining whether the clutch torque limit is closer to the maximum allowed clutch torque limit or to the minimum allowed clutch torque limit; and
based on the determination, setting the clutch torque limit at the closest of the maximum allowed clutch torque limit and the minimum allowed clutch torque limit.

\* \* \* \* \*